United States Patent [19]

Black, Jr.

[11] Patent Number: 5,500,796

[45] Date of Patent: Mar. 19, 1996

[54] METHOD FOR EXTRACTING OPEN-ISSUE DATA FROM TEXTUAL SPECIFICATIONS USING NATURAL LANGUAGE TEXT PROCESSING

[75] Inventor: James E. Black, Jr., Schenectady, N.Y.

[73] Assignee: General Electric Company, Schenectady, N.Y.

[21] Appl. No.: 94,740

[22] Filed: Jul. 22, 1993

[51] Int. Cl.⁶ .................................................. G06F 17/27
[52] U.S. Cl. .............................. 364/419.08; 364/419.01
[58] Field of Search ....................... 395/600; 364/419.19, 364/419.03, 419.08, 419.01, 419.13, 419.06

[56] References Cited

U.S. PATENT DOCUMENTS

| | | | |
|---|---|---|---|
| 5,099,426 | 3/1992 | Carlgren et al. | |
| 5,122,951 | 6/1992 | Kamiya | 364/419.19 |
| 5,197,005 | 3/1993 | Schwartz et al. | 364/419.18 |
| 5,255,386 | 10/1993 | Prager | 395/600 |
| 5,309,359 | 5/1994 | Katz et al. | 364/419.19 |
| 5,331,556 | 7/1994 | Black, Jr. et al. | 364/419.08 |
| 5,373,441 | 12/1994 | Harai et al. | 364/419.02 |
| 5,384,203 | 1/1995 | Withgolt et al. | 364/419.19 |

OTHER PUBLICATIONS

"The Art of Computer Programming, vol. 3, Sorting and Searching", pp. 481–490, Addison–Wesley, 1973.
"Computer Software for Working With Language", by Terry Winograd, Scientific American, vol. 251, Sep., 1984, pp. 131–145.

Primary Examiner—Robert A. Weinhardt
Attorney, Agent, or Firm—David C. Goldman; Paul R. Webb, II

[57] ABSTRACT

A method for extracting open-issue data from a textual specification using a computer is disclosed. The method includes searching for predetermined trigger token morphemes in an enhanced text corpus based upon the textual specification and constituted of respective enhanced sentences so as to electronically mark respective ones of the enhanced sentences based upon the presence of predetermined trigger token morphemes. Linguistic analysis can then be executed upon each remaining unmarked sentences to detect an interrogatory construct in respective ones of the remaining sentences. Sentences marked based either upon the presence of the trigger token morpheme or upon the presence of the interrogatory construct constitute the open-issue data extracted from the textual specification undergoing analysis.

7 Claims, 4 Drawing Sheets

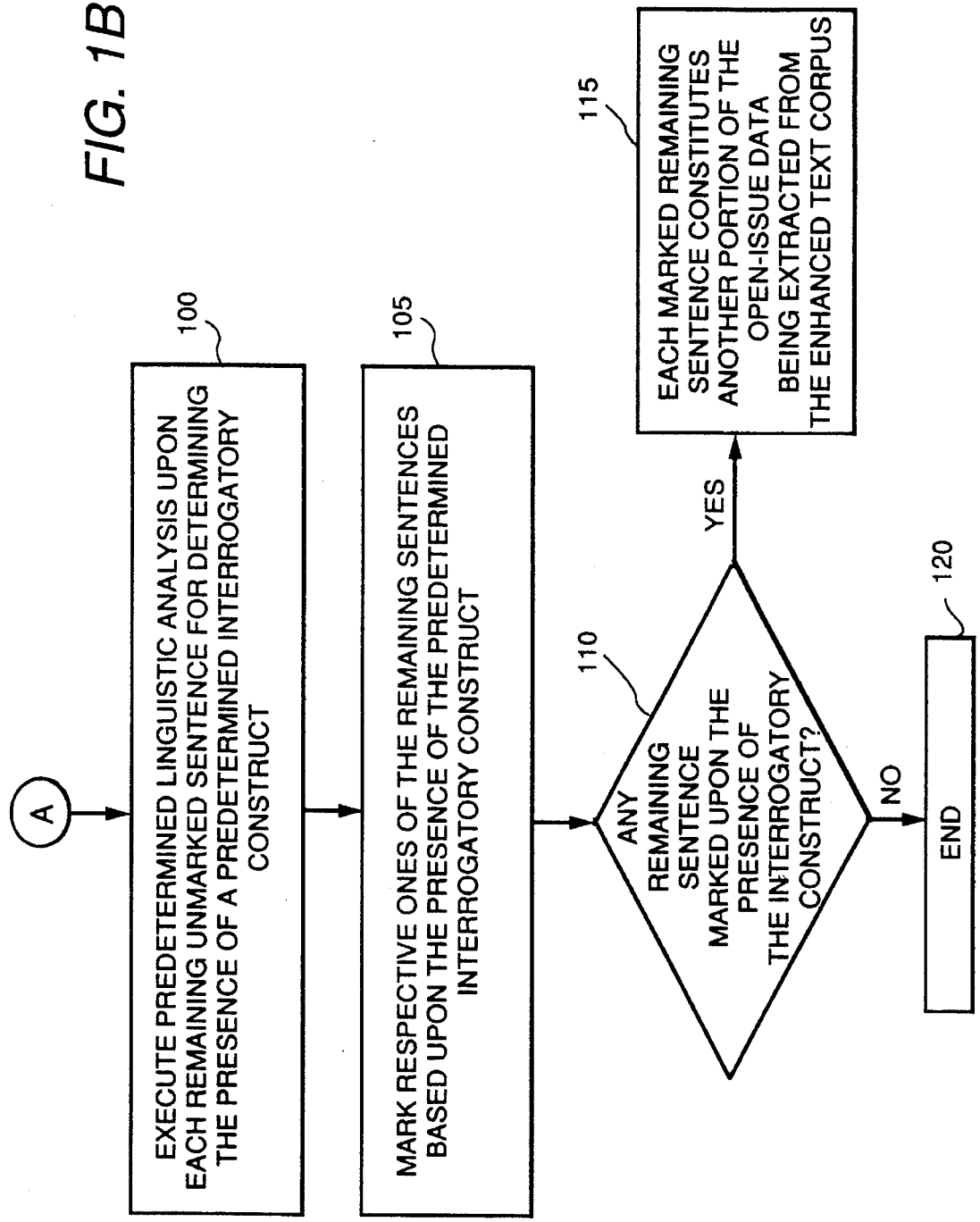

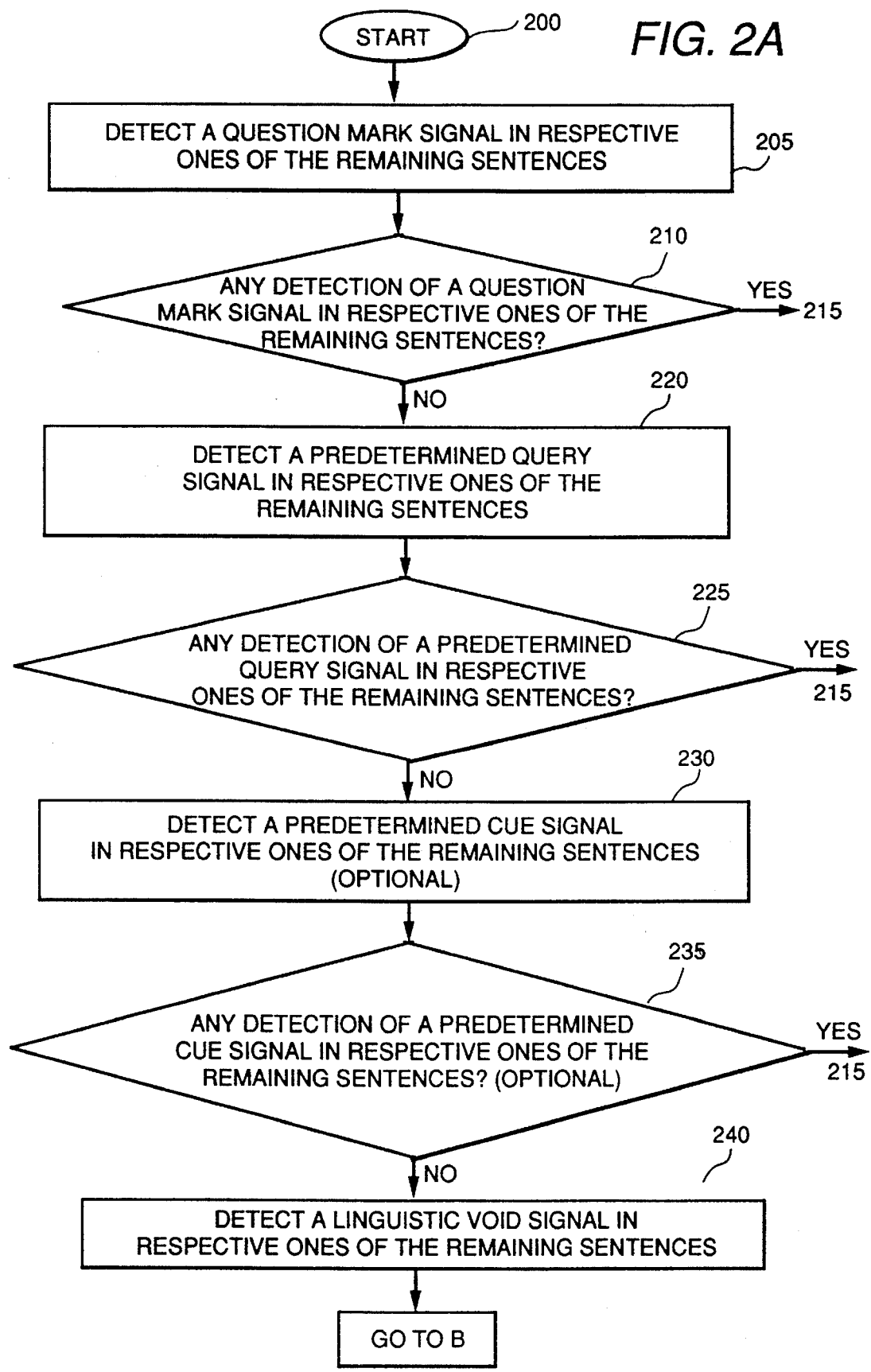

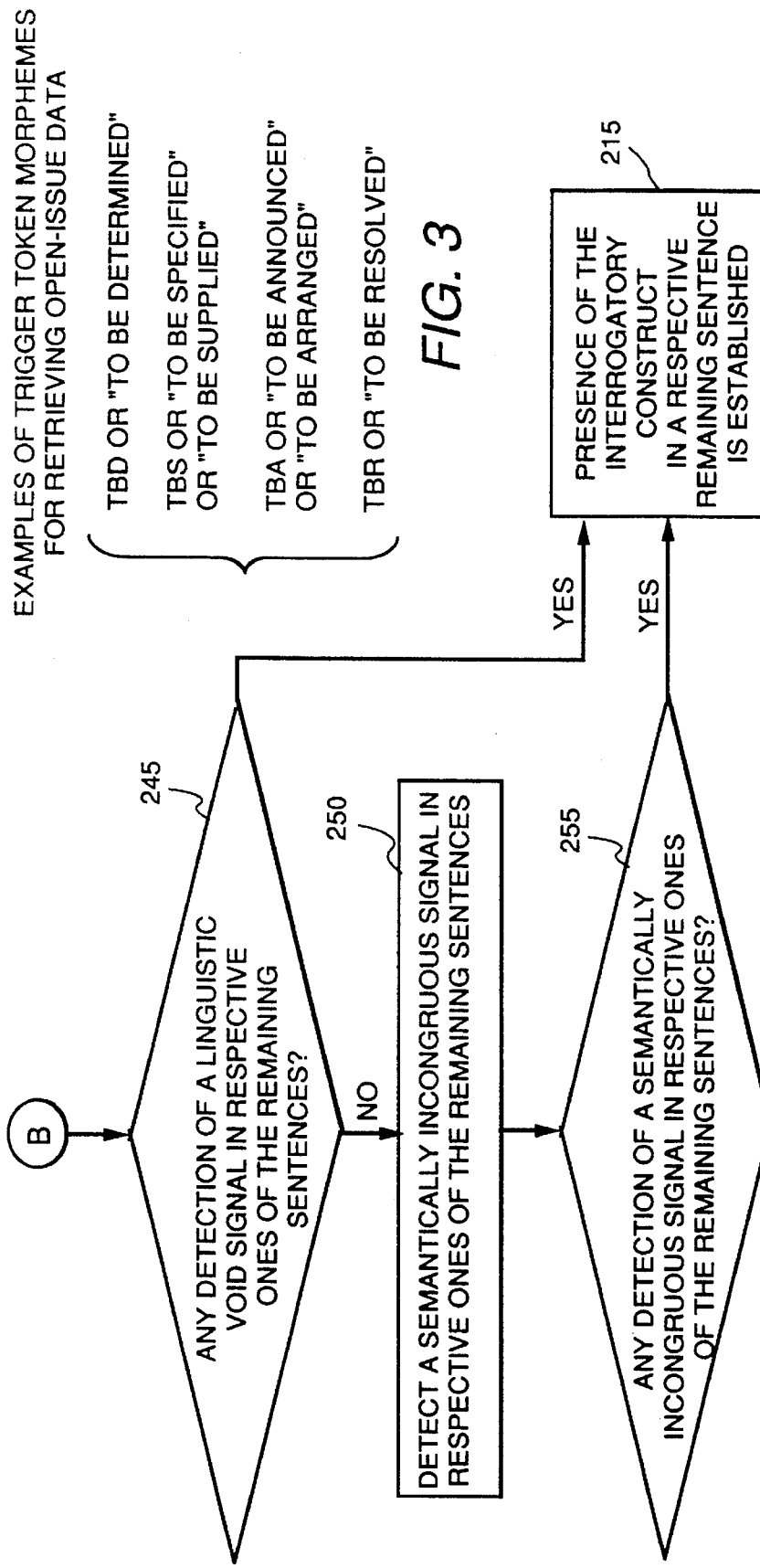

METHOD FOR EXTRACTING OPEN-ISSUE DATA FROM TEXTUAL SPECIFICATIONS USING NATURAL LANGUAGE TEXT PROCESSING

RELATED APPLICATIONS AND PATENTS

This application is related to the application entitled "Method for Extracting Requirement Data from Textual Specifications Using Natural Language Processing", Ser. No. 08/089,945 (RD-22,258), filed Jul. 9, 1993, assigned to the assignee of the present application, and which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The invention disclosed herein relates generally to natural language data processing and, more particularly, to a computer based method for extracting open-issue data from textual specifications.

Sophisticated techniques for archival of electrical signals representative of natural language data allow most business organizations and government agencies to store vast amounts of information in their computer systems. However, regardless of how sophisticated the archival techniques become, the stored information is virtually worthless unless such information can be extracted when requested by an individual user. As used herein, open-issue data refers to incorrectly or inadequately specified data in a textual specification. For example, a textual specification is generally not the medium to find an interrogatory sentence (i.e., a question). If the textual specification does contain a question, there is a high probability that the presence of such question is indicative of an open issue which the user must resolve.

Typical manual techniques for extracting open-issue data incorporated in a natural language textual specification, such as a "Systems Requirements Document" or a "Proposal Request Document" are in general labor intensive and error-prone. Such techniques generally involve any number of highly experienced users who must thoroughly read and understand the content and intent of the document, and ultimately reach a consensus with regard to the open-issue data listed in such textual specification. The problem is additionally compounded because the selection of what is or is not an open issue is often highly subjective, and the criteria for selecting such open issues is likely to vary from user to user, or even for the same user over time.

Alternative techniques have been suggested which have attempted to facilitate to the user the retrieval of specific passages of text and then allow the user to declare that an open issue has been found. Unfortunately, such techniques at best only provide an interface between the user and rite textual specification and thus such techniques do not resolve problems of inconsistencies being that the user must make a subjective decision in order to declare that an open issue has been found.

It is therefore an object of the present invention to provide an improved method for extracting open-issue data which is not subject to the foregoing disadvantages of existing open-issue extracting techniques.

It is another object of the present invention to provide a computerized method for consistently extracting open-issue data so that such data can be easily reviewed, adjudicated and managed by the user and thus improving productivity as well as quality in the extraction of open-issue data.

It is a further object of the invention to provide a method for automatically extracting open-issue data based on predetermined linguistic analysis performed upon a text corpus representative of a predetermined natural language.

SUMMARY OF THE INVENTION

The foregoing and further objects of the invention will become apparent as the description proceeds. In accordance with the present invention a method for extracting open-issue data using a computer is provided. The method includes the steps of providing to the computer an enhanced text corpus comprising respective electrical signals representative of enhanced sentences each constituted of a respective stream of corpus words. Each enhanced corpus word includes linguistic attributes such as part-of-speech and morphological information corresponding thereto. Each enhanced sentence can be scanned for determining the presence of a predetermined trigger token morpheme so that a respective sentence is marked upon the presence of the predetermined trigger token morpheme. Each sentence marked in response to the presence of the trigger token morpheme constitutes at least one portion of the open-issue data being extracted from the enhanced text corpus.

Linguistic analysis may then be executed upon each remaining unmarked sentence for determining the presence of a predetermined interrogatory construct. Each remaining enhanced sentence marked in response to the presence of the interrogatory construct constitutes another portion of the open-issue data being extracted from the enhanced text corpus. The linguistic analysis is based upon detection of grammatical occurrences or predetermined signals which can be utilized to determine the presence of a respective interrogatory construct in respective ones of such enhanced sentences.

BRIEF DESCRIPTION OF THE DRAWINGS

The features of the invention believed to be novel are set forth with particularity in the appended claims. The invention itself, however, both as to organization and method of operation, together with further advantages thereof, may best be understood by reference to the following description in conjunction with the accompanying drawings in which:

FIGS. 1A and 1B show a flowchart illustrating a sequence of steps for extracting open-issue data from an enhanced text corpus;

FIGS. 2A and 2B show a flowchart illustrating a sequence of steps for performing a predetermined linguistic analysis for detecting interrogatory constructs indicative of open-issue data in accordance with the present invention; and FIG. 3 illustrates an exemplary list of abbreviated trigger token morphemes used in one application of the present invention.

DETAILED DESCRIPTION OF THE INVENTION

Figure 1A:
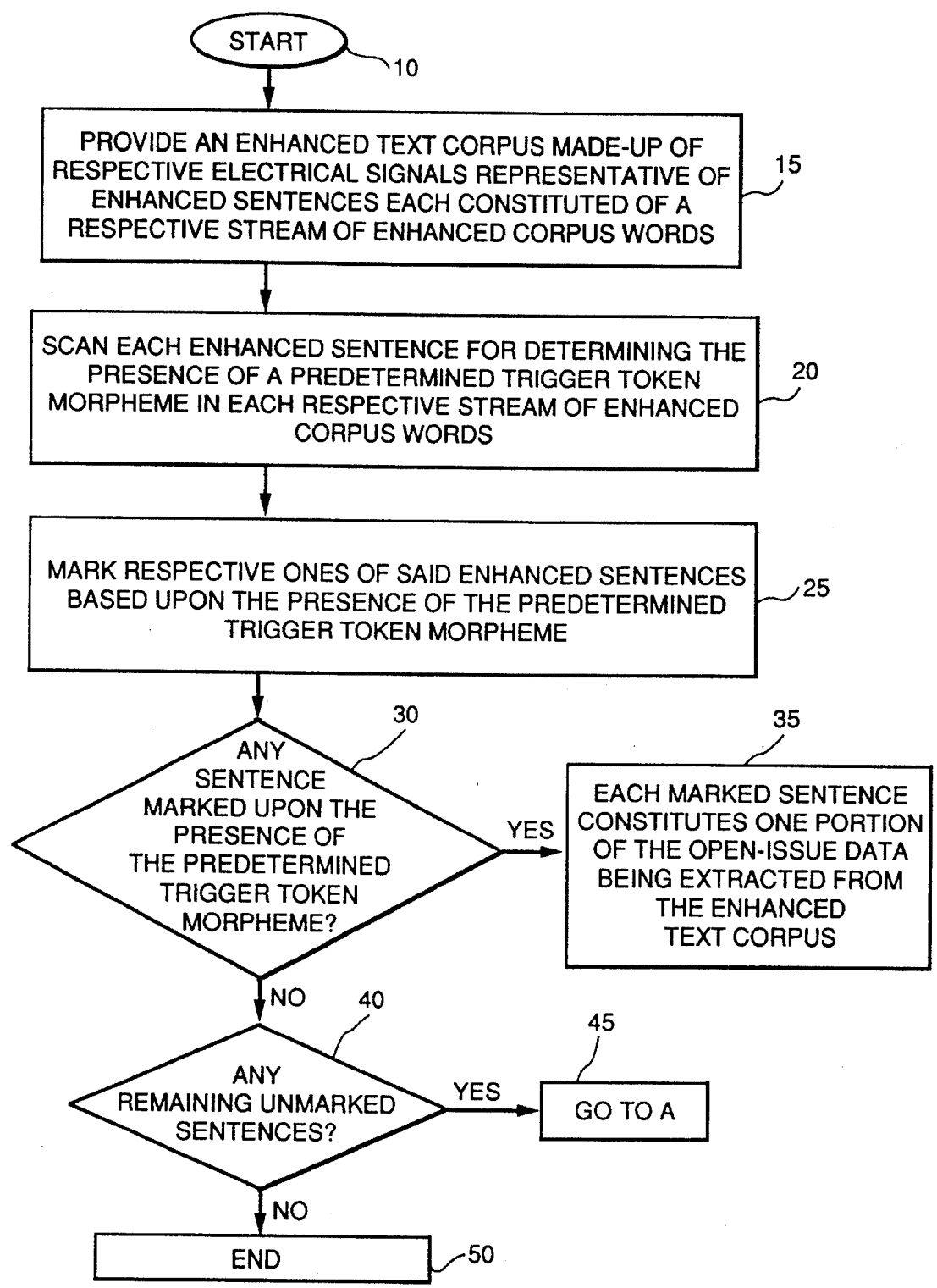

FIGS. 1A and 1B illustrate a sequence of method steps which can be advantageously implemented in a general or special purpose computer; in either case, the computer can be part of a natural language data processing system which can be conveniently used to automatically extract open-issue data from a textual specification in accordance with the present invention. Prior to start of operations, as indicated in step 10, an enhanced text corpus based upon the textual specification, and made up of respective electrical signals representative of enhanced sentences is provided to the computer in step 15 from a bulk storage device such as a disk or tape device; or from a communications link such as a modem and the like. As used herein, natural language refers to a language such as English, Spanish and the like, which human beings speak and write, as distinguished from artificial languages in which computer programs are written.

The enhanced text corpus used in the present invention can be generated in accordance with the method disclosed by James Emmett Black Jr., et al. in U.S. patent application Ser. No. 08/082,710, (RD-22,934), entitled "Method for Natural Language Data Processing Using Morphological and Pan-Of-Speech Information", now U.S. Pat. No. 5,331,556 assigned to the assignee of the present invention and incorporated herein by reference. Briefly, morphological, lexical, semantic syntactic as well as synonym analysis is performed by respective modules upon each stream of corpus words to derive respective linguistic attributes such as part-of-speech information and morphological roots corresponding to respective ones of the corpus words.

The enhanced text corpus generated in accordance with the foregoing patent is made up of a plurality of enhanced sentences each constituted of a respective stream of enhanced words. In particular, each corpus word in a textual specification from which open-issue data is to be extracted is replaced with an enhanced word which includes specific linguistic information pertaining to the corresponding corpus word. It will be appreciated by those skilled in the art that any number of representation techniques for the enhanced corpus words may be used and thus any such representation may be selected to facilitate a particular implementation. By way of illustration and not of limitation, an enhanced corpus word may be represented as follows:

<original corpus word/morphological root/prefixes/suffixes/part-of-speech>

For an abbreviated example in accordance with the foregoing representation, the enhanced word "seeking" may be represented as:

<seeking/seek//ing/x> where "seeking" is the original corpus word, "seek" is the morphological root, for simplicity of illustration the list of prefixes is empty while the list of suffixes is limited to the suffix "ing" only. The part-of-speech information represented by the letter "x" is not specifically listed in this example, since it is dependent upon the specific word usage in the sentence. For instance, "seeking" could have been part of a verbal phrase acting as verb ("seeking open-issues"), or, alternatively, part of a noun phrase acting as an adjective ("heat seeking missile"). Additionally, groups of text corpus words, such as phrases, are defined and tagged in terms of an estimated grammatical function. For example, a respective phrase can be tagged as a verbal phrase, or as noun-phrase or as a prepositional phrase based on the estimated grammatical function assigned to this phrase.

As indicated in scanning step 20, each enhanced sentence is scanned for determining the presence of a predetermined trigger token morpheme in each respective stream of enhanced corpus words. As used herein, a trigger token morpheme refers to a linguistic unit representation which is constituted of one or more words or characters and which can include morphological and part-of-speech information for the purpose of triggering a match or "hit" during a textual search. In step 25, respective ones of the enhanced sentences are marked, i.e., electronically marked with a suitable indication based upon the presence of the predetermined trigger token morpheme. In step 30, a determination is made as to whether any enhanced sentences were respectively marked based upon the presence of any such predetermined trigger token morpheme. For example, if a particular sentence contains a predetermined trigger token morpheme such as "TBD" or other suitable trigger token morpheme, then that particular sentence is marked and, as indicated in step 35, such sentence and any additional sentences being respectively marked based upon the presence of respective trigger token morphemes constitute one portion of the open-issue data being extracted from the enhanced text corpus. This one portion of the open-issue data can be conveniently stored in a bulk storage device or transmitted via a communications link to a remote storage device for subsequent use or processing. An exemplary list of trigger token morphemes which has been reduced to practice in the context of extracting open-issue data in the application domain of Aerospace Systems Engineering is illustrated in FIG. 3.

In step 40 of FIG. 1A, a determination is made as to the presence of any remaining unmarked sentences, that is, sentences which were not respectively marked because no predetermined trigger token morpheme was encountered therein. If there are remaining unmarked sentences, then as indicated in step 45, operations continue at connecting node A of FIG. 1B. If in step 40, however, there is no evidence of any remaining unmarked sentence, then operations end in step 50. This simply indicates that each enhanced sentence scanned in step 20 contained a respective trigger token morpheme and therefore each of such sentences in all likelihood comprises open-issue data.

It should be appreciated that operational steps illustrated in FIG. 1A for the purpose of finding trigger token morphemes are optionally performed and are not a prerequisite to the operational steps illustrated in FIG. 1B. Thus, depending on the particular application, the process to extract open-issue data could easily start at node A of FIG. 1B, with the proviso that the designation "remaining sentences" would not be applicable since in this case each enhanced sentence in the text corpus would be analyzed as described shortly hereafter in the context of FIG. 1B.

To increase the probability of extracting additional open-issue data, further operations are performed upon each remaining unmarked sentence, and to this effect operations resume in FIG. 1B at connecting node A, or, as previously explained, operations could directly start at node A. In particular, in this section of the method, predetermined linguistic analysis is performed in step 100 upon each remaining unmarked sentence for determining the presence of a predetermined interrogatory construct. As used herein, an interrogatory construct refers to a grammatical construction or predeterminable signals indicating a high probability that a particular sentence contains open-issue data, i.e., data which instructs the user as to deficiencies or incompatibilities which must be resolved by the user prior to utilizing the textual specification for its intended purpose. It should be appreciated by those skilled in the art that such predetermined linguistic analysis can be performed independent of the steps for finding trigger token morphemes described in the context of FIG. 1A, i.e., in the context of extracting open-issue data based upon the presence of trigger token morphemes. Therefore, the steps illustrated in FIG. 1B could be performed prior to the steps illustrated in FIG. 1A. Further, assuming enough computational power is available, the steps in FIGS. 1A and 1B could be performed simultaneously, that is, the extraction of open-issue data based upon the presence of trigger token morphemes could be performed in parallel with the extraction of open-issue data based upon the presence of the predetermined interrogatory construct. Those skilled in the art should further appreciate that with sufficient computational power the linguistic enhancement of the text corpus could be performed in parallel with the respective operational steps illustrated in FIGS. 1A and 1B respectively.

In step 105, respective ones of the remaining sentences are marked based upon the presence of the predetermined interrogatory construct. In step 110, a determination is made as to the presence of any such remaining sentences which were marked upon the presence of the predetermined interrogatory construct. If the determination is in the affirmative, then any remaining sentences marked upon the presence of the interrogatory construct constitute another portion of the open-issue data being extracted from the enhanced text corpus, as indicated in step 115. Here again, this portion of the open-issue data can be conveniently stored in a bulk storage device or transmitted via a communications link to a remote storage device for subsequent use or processing. Otherwise, if the determination of step 110 indicates that there are no remaining enhanced sentences marked upon the presence of the interrogatory construct then, as indicated in step 120, operations are terminated.

The predetermined linguistic analysis executed in step 100 of FIG. 1B upon each remaining unmarked sentence to determine the presence of the respective interrogatory construct is based upon grammatical features or signals which in all probability indicate the presence of editorial ambiguity or missing information which requires specific action from the user, i.e., to resolve such ambiguity, open-issue data such as "How often does the system recycle?" requires the user to investigate based upon the missing information which in the foregoing example is denoted by a question. FIGS. 2A and 2B illustrate a sequence of steps which constitute the predetermined linguistic analysis executed in step 100 of FIG. 1B to extract open-issue data based upon determining the presence of such interrogatory construct. In general, sentences which pose respective questions to users require the addressed user to resolve the posed question. Typical interrogatory sentences generally include in a majority of cases, but not always, a closing question mark. Thus, predetermined linguistic occurrences can be advantageously utilized to determine the presence of an interrogatory construct in a particular sentence. Once the presence of the predetermined construct has been established in a particular sentence, then such particular sentence can be designated with a substantial degree of certainty as open-issue data.

Subsequent to start of operations in step 200, each respective remaining enhanced sentence is analyzed in step 205 to detect the presence of a question mark signal in respective ones of the remaining sentences. This step easily allows detection of an interrogatory construct since in English a direct interrogative sentence is likely to have a closing question mark signal. Often a question mark is also used as a signal to denote an unknown quantity or specification parameter or otherwise to simply indicate that data is missing. An example of the foregoing is "The System shall recycle every? hours". Therefore, any occurrence of a question mark signal in a respective enhanced sentence is considered as sufficient justification to mark such sentence as containing open-issue data. An alternative implementation would be to define the question mark signal as an abbreviated trigger token and allow for its detection during that stage of the process. In step 210, if detection is made of the presence of a question mark signal, then as indicated in step 215 the presence of the interrogatory construct in such remaining sentence is established, that is, this particular sentence has a substantial probability of incorporating open-issue data. If no such detection is made, the linguistic analysis continues in detecting step 220.

In English, perhaps the simplest way to detect an interrogatory sentence is to detect that the sentence is terminated with a question mark signal (?). However, there are situations where detection of an interrogatory sentence is not that simple. Interrogatory sentences such as: "How reliable is the vendor", or "How many versions does it support." or "Who is going to service this product." or "What is the mean-time between failures" have been observed in sample specifications and have not been terminated with respective question marks. Thus, the general form of such interrogatory sentences which have been observed in sample textual specifications start with query words such as who, what, when, where, how and why followed by a trailing verb such as "to be" or "to do". The analysis is complicated because the foregoing query words can be easily confused as respective elements of prepositional phrases. Usually, however, a prepositional phrase supplements additional phrases making-up a complete sentence, and thus prepositional phrases containing the foregoing exemplary query words can be disambiguated because such prepositional phrases typically do not stand alone without another phrase such as a noun phrase, for example. Thus, a useful exemplary pattern which may be used to detect the predetermined interrogative construct in step 230 may be represented as follows:

<"Query Word" and "form of verbs BE or DO">.

The foregoing pattern is referred herein as a query signal, i.e., a predetermined exemplary query word in conjunction with a trailing form of either the verbs Be or Do. If detection is made in step 225 of a query signal as described herein, then, as indicated in step 215, such detection establishes the presence of the predetermined interrogatory construct. If no such detection is made, the linguistic analysis continues in step 230.

If operations had started directly at node A of FIG. 1B, then in step 230 each enhanced sentence can be optionally scanned for determining the presence of predetermined cue signals deliberately placed into the text corpus by the editors to indicate the presence of editorial uncertainty i.e., to indicate the presence of open issue data. Typical clue signals include but are not limited to: TBD, TBS, TBA, TBR and the like. The foregoing exemplary cue signals, in essence, function as simplified trigger token morphemes with the proviso that trigger token morphemes offer more versatility for extracting data since trigger token morphemes are not limited to specific expressions or words because they can include at least morphological and part-of-speech information corresponding to one or more original corpus words. Therefore, detecting step 230 permits an optional way of establishing the presence of an interrogatory construct. Thus, if in step 235, a predetermined cue signal is detected, then such detection indicates the presence of the predetermined interrogatory construct, that is, such particular sentence has a substantial probability of incorporating open-issue data.

Another feature which has been observed in textual specifications to indicate the presence of open-issue dam is the presence of linguistic void signals. Thus, in step 240, each enhanced sentence is scanned for detecting the presence of respective linguistic void signals which typically function as "place-holders" to facilitate filling missing information from a given textual specification under analysis. Typical linguistic void signals include but are not limited to: underscores ("_"), empty parenthesis ("()"), empty quotation marks ("" "") and other such empty delimiter pairs with no characters between them, e.g., ("<>"), ("{}"), ("[]") and the like.

Another type of linguistics void signal which is application domain and context sensitive is the case of unit-designation words which are not preceded by a quantity word or phrase. For example, in the sentence "The width of the unit is cm.", syntactic analysis indicates that the object noun-phrase should contain a measurement appropriate for width. However, during this step of the analysis, a parser fails to discover a word or phrase preceding cm which can be interpreted as a quantity indication. Conversely, "4 cm" would not have constituted a linguistic void. Similarly, "is in cm" would also not have constituted a linguistic void since the presence of prepositional phrase "in cm" would have been recognized, thus obviating the need of declaring an open issue. Thus, another way of analyzing a sentence for the presence of an interrogatory construct is to determine the presence of linguistic void signals, as indicated in step 240.

Subsequent to step 240, the linguistic analysis continues in connecting node B of FIG. 2B. In step 245, if such detection of linguistic void signals is made, then the presence of the interrogatory construct is established in step 215 and thus such particular remaining sentence has a substantial probability of containing open-issue data. If no such detection is made, then the linguistic analysis continues in detecting step 250 wherein each enhanced sentence is scanned for determining the presence of domain specific semantic incongruities which may indicate that the current sentence under examination contains open-issue data. Semantic incongruities in a given textual specification are in general highly context sensitive, and their detection relies upon obtaining domain specific knowledge.

Typical semantic incongruities might include, but not limited to quantities expressed with context unsuitable units. For example, using time units to express distance (and conversely) as well as other similar constructs such as "The water depth is 14 liters." Generally, such semantic incongruities involve improper matching of units of volume, temperature, time, weight, mass, length, etc., with the usage of the quantity designations within the context of the respective sentence under examination. Other type of semantic incongruities may involve improper matches of concept words, and in these cases considerable domain specific knowledge is required to detect such incongruities. Such domain specific knowledge can be obtained from a sufficiently populated electronic lexicon. For example, a classic illustration is provided in "Colorless green ideas slept furiously." In this case, the parser must recognize that "green" is a color, and that the modifier "colorless" is not a suitable match. The adjective phrase "colorless green" modifying "ideas" is therefore incongruous for two reasons: First is that "colorless green" is semantically contradicting, and second is that "ideas" do not generally have a color attribute. Additionally, the verbal phrase "slept furiously" is semantically incongruous, since the domain specific knowledge can indicate that "sleeping" is not an activity which lends itself to being done furiously or with great consumption of energy. If no detection is made in step 255 of semantically incongruous signals then operations end in step 260. Otherwise the presence of a predetermined interrogatory construct is established in step 215. Again, the presence of such interrogatory construct, if detected, indicates a high probability that such enhanced sentence contains open-issue data. Those skilled in the art will appreciate that the foregoing steps for executing the predetermined linguistic analysis need not be sequentially performed as specifically illustrated in FIGS. 2A and 2B, since other alternative sequences can equally detect the presence of the interrogatory construct in the enhanced sentences.

As herein described the natural language processing method of the represent invention permits the automatic extraction and acquisition of open-issue data which can then be efficiently managed by less experienced users than otherwise would be possible in the absence of the foregoing processing method.

Appendix I contains computer source code listing which may be utilized to control operation of a computer in accordance with the present natural language data processing method. The code as written may be executed by a Sun Workstation, for example.

While only certain features of the invention have been illustrated and described herein, many modifications and changes will occur to those skilled in the art. It is therefore, to be understood that the appended claims are intended to cover all such modifications and changes as fall within the spirit of the invention.

Appendix I

Source Code Listings

IssRoots

```
TBD
TBR
TBS
TBA
*q-mark*
```

Iss-Extractor.c

```c
/***************************************************************

Iss-Extractor.c

Routines to perform issues extraction from the source frame,
   building a corresponding sentence view, as well as individual
   issue and auxilliary supporting frames.

-------------------

Copyright 1993   General Electric Company

Author:  Janet A. Barnett

***************************************************************/

/***************************************************************/
/*                                                             */
/*       Extraneous Infrastructure and Support Code Elided   /* ... /* */
/*                                                             */
/***************************************************************/

/* ... */

/* maintain lists of issue trigger roots */ define ISSROOTFILE    "issroots"

/* ... */

/*{
   ************************************************************
   Returns the claimcode based on just a trigger token check - Note
   the claimcode of "?" is returned if that is the trigger token
   matched.

Inputs: lineofroots - root words of current sentence
   Outputs: returns character string representing claimcode

************************************************************
}*/
char *triggertokencheck(lineofroots)
char *lineofroots;
{
   static char result[5];
```

```
  char *root;
  int i, j;

result[0] = '\0';
  /* for now, we only perform the trigger token check */
  root = strtok(lineofroots, " \n");
  while (root != NULL) {
    i = 0;  j = 0;
    while (j < maxissroots) {
      if (strcasecmp(issroots[j], root) == 0) {
        if (strcasecmp(root, "*q-mark*") == 0) {
          (void) strcpy(result, "?");
          return(result);
        }
        (void) strcpy(result, "I");
      }
      j++;
    }

/* skip to next word */
    root = strtok(CHAR_NULL, " \n");
  }
  if (result[0] == '\0')
    (void) strcpy(result, "U");
  return(result);
}

/* ... */

/*{
  ***********************************************************************
  Reads in the roots from the issue root file Inputs: None
  Outputs: None - sets issroots

***********************************************************************
}*/
void get_roots()
{
  FILE *fpReq, *fpIss;
  char line[BUF_SIZE], *tmp;

fpIss = fileopen(ISSROOTFILE, "r");
  if (fpIss == NULL) {
    (void) fclose(fpError);
    exit(2);
  } while (fgets(line, BUF_SIZE, fpIss) != NULL) {
    maxissroots++;
    line[strlen(line) - 1] = '\0';      /* get rid of '\n' */
    tmp = str_malloc(line);
    issroots[maxissroots - 1] = tmp;
  }
  (void) fclose(fpIss);
}

/* ... */
```

What is claimed is:

1. A natural language text processing method using a computer for extracting open-issue data from a textual specification, said method comprising the steps of:

providing an enhanced text corpus based upon said textual specification to said computer, said enhanced text corpus comprising electrical signals representative of enhanced sentences each constituted of a stream of enhanced corpus words;

scanning each of said enhanced sentences for determining the presence of a predetermined trigger token morpheme in each said stream of enhanced corpus words;

marking said enhanced sentences having the presence of said predetermined trigger token morpheme, the marked enhanced sentences indicative of one portion of said open-issue data;

executing predetermined linguistic analysis upon each remaining unmarked sentence for determining the presence of a predetermined interrogatory construct in said remaining sentences;

marking said remaining sentences having the presence of said interrogatory construct, the marked remaining sentences indicative of another portion of said open-issue data; and extracting the marked portions indicative of said open-issue data.

2. A method in accordance with claim 1 wherein said predetermined linguistic analysis includes detecting a predetermined query signal in said remaining sentences.

3. A method in accordance with claim 1 wherein said predetermined linguistic analysis includes detecting a question mark signal in said remaining sentences.

4. A method in accordance with claim 1 wherein said predetermined linguistic analysis includes detecting a linguistic void signal in said remaining sentences.

5. A method in accordance with claim 1 wherein said predetermined linguistic analysis includes detecting semantically incongruous signals in said remaining sentences.

6. A method in accordance with claim 1 wherein said predetermined linguistic analysis comprises:

detecting a question mark signal in said remaining sentences;

detecting a predetermined query signal in said remaining sentences;

detecting a linguistic void signal in said remaining sentences; and detecting semantically incongruous signals in said remaining sentences;

wherein detection in any of the foregoing recited detecting steps establishes the presence of said interrogatory construct.

7. A natural language text processing method using a computer for extracting open-issue data from a textual specification, said method comprising the steps of:

providing an enhanced text corpus based upon said textual specification to said computer, said enhanced text corpus comprising electrical signals representative of enhanced sentences each constituted of a stream of enhanced corpus words;

executing predetermined linguistic analysis upon each enhanced sentence for determining the presence of a predetermined interrogatory construct in said enhanced sentences, said predetermined linguistic analysis comprising:

detecting for a question mark signal in said enhanced sentences;

detecting for a predetermined query signal in said enhanced sentences;

detecting for a predetermined cue signal in said enhanced sentences;

detecting for a linguistic void signal in said enhanced sentences; and detecting for semantically incongruous signals in said enhanced sentences;

wherein detection in any of the foregoing recited detecting steps establishes the presence of said interrogatory construct;

marking said enhanced sentences having the presence of said interrogatory construct; and extracting the marked sentence indicative of said open-issue data.

* * * * *